(12) United States Patent
Usui

(10) Patent No.: US 12,203,533 B2
(45) Date of Patent: Jan. 21, 2025

(54) ELECTRIC ACTUATOR

(71) Applicant: Hitachi Astemo, Ltd., Ibaraki (JP)

(72) Inventor: Koji Usui, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/026,203

(22) PCT Filed: Oct. 6, 2021

(86) PCT No.: PCT/JP2021/036984
§ 371 (c)(1),
(2) Date: Mar. 14, 2023

(87) PCT Pub. No.: WO2022/075363
PCT Pub. Date: Apr. 14, 2022

(65) Prior Publication Data
US 2023/0366456 A1 Nov. 16, 2023

(30) Foreign Application Priority Data

Oct. 9, 2020 (JP) ................................ 2020-171523

(51) Int. Cl.
*F16H 25/24* (2006.01)
*F16H 25/20* (2006.01)

(52) U.S. Cl.
CPC ............. *F16H 25/24* (2013.01); *F16H 25/20* (2013.01); *F16H 25/2418* (2013.01)

(58) Field of Classification Search
CPC .............................. F16H 25/24; F16H 57/0497
See application file for complete search history.

(56) References Cited

U.S. PATENT DOCUMENTS 9,939,055 B2 * 4/2018 Miyazaki ............ F16H 57/0497
2001/0010176 A1 8/2001 Tsukada et al.
(Continued)

FOREIGN PATENT DOCUMENTS

EP 3 418 140 12/2018
EP 4 253 797 10/2023
(Continued)

OTHER PUBLICATIONS

International Search Report issued Nov. 2, 2021 in International Application No. PCT/JP2021/036984, with English translation.
(Continued)

*Primary Examiner* — Bobby Rushing, Jr.
(74) *Attorney, Agent, or Firm* — Wenderoth, Lind & Ponack, L.L.P.

(57) ABSTRACT

An electric actuator including: an electric motor capable of rotating forward and backward; and a motion conversion mechanism configured to convert rotation of the electric motor into reciprocating linear motion of a screw shaft. The motion conversion mechanism including: a nut configured to be rotationally driven by the electric motor; and the screw shaft capable of being threadedly inserted through the nut. A lubricant holding portion having an outer diameter larger than a diameter of a screw hole of the nut and being capable of housing lubricant is formed on an inner periphery of an end of the nut in an axial direction. A lid member configured to cover an opening end of the lubricant holding portion in an axial direction is provided. Thus, an electric actuator can prevent wear at a threaded engagement portion between a nut and a screw shaft by sufficiently lubricating the threaded engagement portion.

7 Claims, 8 Drawing Sheets

(56) References Cited

U.S. PATENT DOCUMENTS

2016/0298757 A1    10/2016  Miyazaki et al.
2018/0259073 A1*   9/2018   Ootani .................... F16H 25/24

FOREIGN PATENT DOCUMENTS

| JP | 53-14413       |   | 9/1976  |
|----|----------------|---|---------|
| JP | 10299854 A     | * | 11/1998 |
| JP | 2001-132813    |   | 5/2001  |
| JP | 2008045632 A   | * | 2/2008  |
| JP | 4923624 B2     | * | 4/2012  |
| JP | 2015-105664    |   | 6/2015  |
| JP | 2019-6223      |   | 1/2019  |

OTHER PUBLICATIONS

Written Opinion of the International Searching Authority issued Nov. 2, 2021 in International Application No. PCT/JP2021/036984, with English translation.
Extended European Search Report issued Mar. 1, 2024 in corresponding European Patent Application No. 21877662.3.

* cited by examiner

ELECTRIC ACTUATOR

TECHNICAL FIELD

The present invention relates to an electric actuator including a motion conversion mechanism configured to convert rotation of an electric motor, which is capable of rotating forward and backward, into a reciprocating linear motion of a screw shaft BACKGROUND ART An electric actuator includes an electric motor capable of rotating forward and backward and a motion conversion mechanism configured to convert rotation of the electric motor into a reciprocating linear motion of a screw shaft. When a nut of the motion conversion mechanism is rotated forward and backward by the electric motor, the screw shaft threadedly inserted through the nut in a back and forth movable manner moves in a reciprocating linear motion. Such an electric actuator is used in, for example, an electric parking brake device of a vehicle (see Patent Literature 1).

In an electric parking brake device including such an electric actuator, when a parking brake lever provided in a drum brake moves from a release position to an operating position by a reciprocating linear motion of a screw shaft of the electric actuator, brake shoes are pressed against an inner peripheral surface of a brake drum that rotates together with a wheel so that a frictional resistance force generated therebetween brakes the rotation of the wheel, bringing the vehicle into a parking brake state. Further, when the electric motor of the electric actuator is rotated backward from the parking brake state, the parking brake lever moves from the operating position to the release position so that the brake shoes move away from the inner peripheral surface of the brake drum, releasing the vehicle from the parking brake state.

Incidentally, in a motion conversion mechanism of an electric actuator, a screw shaft screw threadedly inserted through a nut moves in a reciprocating linear motion relative to the nut. Thus, there is a problem in that sliding friction is generated at the threaded engagement portion between the screw shaft and the nut, which causes wear at the threaded engagement portion.

In view of this, in Patent Literature 2, there is proposed a configuration in which an oil groove is formed at a female thread portion of a nut threadedly engaged with a male thread portion of a screw shaft and lubricating oil is collected in the oil groove. With such a configuration, the lubricating oil collected in the oil groove is drawn out from the oil groove by the relative rotation of the screw shaft and the nut, and the lubricating oil is supplied to the entire threaded engagement portion between the male thread portion of the screw shaft and the female thread portion of the nut, thereby lubricating the engagement portion.

Further, in Patent Literature 3, there is proposed a configuration in which a solid lubricant is embedded in a screw sleeve (nut) that threadedly engages with a screw spindle (screw shaft), and a solid lubricant stop plate is provided at upper and lower ends of the screw sleeve. With such a configuration, the solid lubricant stop plate prevents the solid lubricant embedded in the screw sleeve escape from exiting the screw sleeve, enabling stable lubrication of the threaded engagement portion between the screw spindle and the screw sleeve by the solid lubricant.

CITATION LIST

Patent Literature

PTL 1: Japanese Patent Application Laid-open No. 2019-006223

PTL 2: Japanese Patent Application Laid-open No. 2001-132813

PTL 3: Japanese Utility Model Application Laid-open No. Sho 53-014413

SUMMARY OF INVENTION

Technical Problem

Incidentally, with the electric actuator proposed in Patent Literature 1, when a lubricant, for example, grease is applied to the screw shaft to lubricate the threaded engagement portion between the nut and the screw shaft, the rotation of the nut may cause the lubricant to enter the interior of the nut, lubricating the threaded engagement portion between the nut and the screw shaft. However, the following problems arise.

That is, as illustrated in FIG. 8(a) and FIG. 8(b), when a screw shaft 103 moves in a reciprocating linear motion in the direction of the arrow, the lubricant applied to the screw shaft 103 is wiped off by a nut 108 and accumulates at both end portions (at or near the movement limit) of the screw shaft 103 in an axial direction. Further, when the lubricant accumulates at an end surface of the nut 108, the lubricant is scattered out by the centrifugal force generated by the rotation of the nut 108. Thus, there is a problem in that the lubricant at a central portion (portion A of FIG. 8) of the screw shaft 103 in the axial direction becomes insufficient and the oil film disappears, which causes acceleration of wear at this portion.

Further, with the lubrication structure proposed in Patent Literature 2, the oil groove is formed at the upper end of the female thread portion of the nut, Thus, there is a problem in that this lubrication structure can be applied only to a configuration in which the nut and the screw shaft are arranged in a vertical direction.

Further, with the lubrication structure proposed in Patent Literature 3, the lubricant is limited to a solid lubricant, Thus, there is a problem in that the application range of this lubrication structure is narrow.

The present invention has been made in view of the problems described above, and an object of the present invention is to provide an electric actuator that can prevent wear at a threaded engagement portion between a nut and a screw shaft by sufficiently lubricating the threaded engagement portion, thereby being capable of improving the durability of the nut and the screw shaft.

Solution to Problem

In order to achieve the object described above, the present invention has a first feature that there is provided an electric actuator including: an electric motor capable of rotating forward and backward: and a motion conversion mechanism configured to convert rotation of the electric motor into a reciprocating linear motion of a screw shaft, the motion conversion mechanism including: a nut configured to be rotationally driven by the electric motor; and the screw shaft capable of being threadedly inserted through the nut in a back and forth movable manner. A lubricant holding portion having an outer diameter larger than a diameter of a screw hole of the nut and being capable of housing a lubricant is formed on an inner periphery of an end of the nut in an axial direction. A lid member configured to cover an opening end of the lubricant holding portion in the axial direction is provided.

Further, in addition to the first feature, the present invention has a second feature that, the lid member integrally includes: a lid portion; and a tubular portion coaxial with the nut, and the lid member is mounted to the but through fitting of a protrusion portion formed on an inner periphery of the tubular portion to a recess portion firmed in an outer periphery of the nut or through fitting of a protrusion portion formed on the outer periphery of the nut to a recess portion formed in the inner periphery of the tubular portion.

In addition to the second feature, the present invention has a third feature that a scraper portion having a cylindrical shape is formed on an inner periphery of the lid portion, and an inner diameter of the scraper portion is slightly larger than an outer diameter of the screw shaft so that a small gap in a radial direction is formed between the scraper portion and the screw shaft.

In addition to the second or third feature, the present invention has a fourth feature that an outer diameter of the tubular portion is equal to or less than an outer diameter of the nut.

Further, in addition to any one of the first to fourth features, the present invention has a fifth feature that the lid member is made of a rubber material.

Advantageous Effects of Invention

According to the first feature of the present invention, even when rotation of the nut causes the screw shaft to enter the nut, the lubricant applied to the screw shaft is held in the lubricant holding portion of the nut. Thus, extra lubricant does not accumulate at the end surface of the nut, and the accumulated lubricant is not scattered out b the centrifugal force generated by the rotation of the nut. Further, the lubricant collected in the lubricant holding portion of the nut is applied to the screw shaft when the screw shaft comes out from the nut. However, the application amount of the lubricant is restricted by the lid member. Thus, the necessary sufficient amount of lubricant is applied to the screw shaft in a broad range. As a result, partial insufficiency of lubricant (oil film disappearing) on the screw shaft does not occur, and the threaded engagement portion between the nut and the screw shaft is sufficiently lubricated, thereby preventing wear at the threaded engagement portion and improving the durability of the nut and the screw shaft.

According to the second feature of the present invention, the lid member can be easily mounted to the outer periphery of the nut by one action of fitting recess portions and protrusion portions.

According to the third feature of the present invention, the inner diameter of the scraper portion formed on the inner periphery of the lid portion of the lid member is slightly larger than the outer diameter of the screw shaft so that a small gap in the radial direction is formed therebetween. Thus, the lubricant collected in the lubricant holding portion of the nut is scraped by the scraper portion and is applied evenly at a predetermined thickness on the screw shaft, in this case, the scraper portion is in non-contact with the screw shaft. Thus, no frictional resistance force is generated therebetween, thereby allowing the screw shaft to slide smoothly without resistance. Further, the scraper portion does not receive an external force from the screw shaft, Thus, the scraper portion is prevented from being damaged, thereby improving the durability of the lid member.

According to the fourth feature of the present invention, the outer diameter of the tubular portion of the lid member is equal to or less than the outer diameter of the nut. Thus, when the lid member is installed, and the nut is installed on the radial bearings, the nut can be mounted without the lid member interfering with the radial bearings.

According to the fifth feature of the present invention, the lid member is made of a rubber material that is flexible and has good elasticity. Thus, even in a case in which the lid member cones into contact with the screw shaft, the lid member is prevented from being damaged, thereby improving the durability of the lid member.

Figure 1:
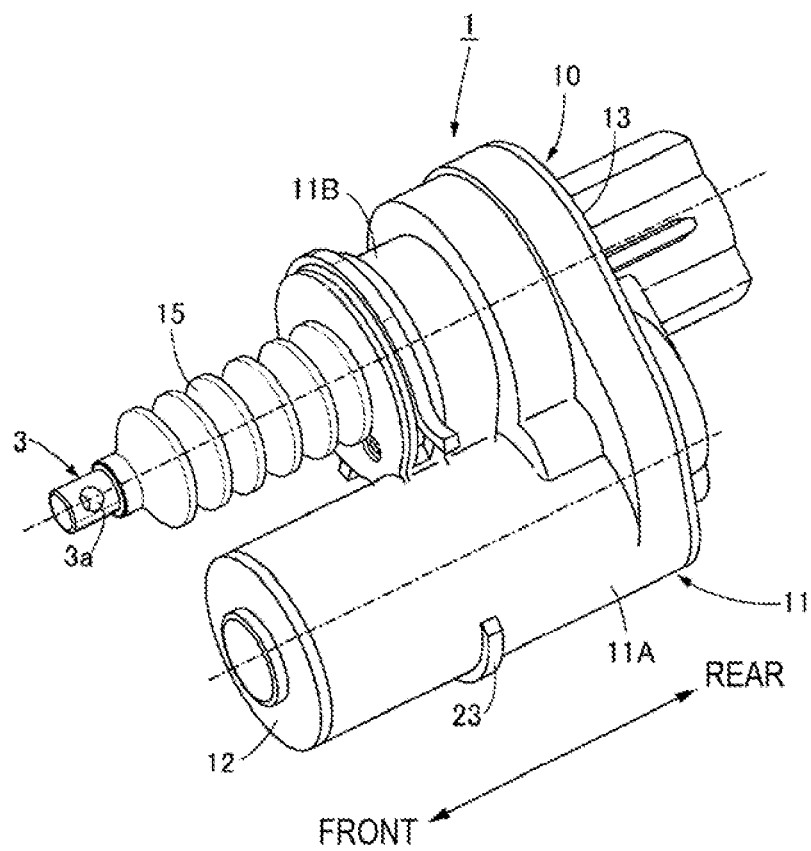
FIG. 1 is a perspective view of an electric actuator according to the present invention.

REFERENCE SIGNS LIST 1 electric actuator
2 electric motor
2a output shaft of electric motor
3 screw shaft
3b male thread of screw shalt
4 motion conversion mechanism
5 transmission mechanism
6 driving gear
8 nut
8A sleeve portion of nut
8B drum portion of nut
8a female thread of nut
8b recess portion of nut
10 actuator case
19 intermediate gear
20 driven gear
21 lubricant holding portion
22 lid member
22A lid portion of lid member
22B tubular portion of lid member
22a scraper portion of lid member
22b protrusion portion of lid member
φD inner diameter of scraper portion
φd outer diameter of screw shaft
δ small gap

DESCRIPTION OF EMBODIMENTS

An embodiment of the present invention is now described with reference to the accompanying drawings.

Figure 2:
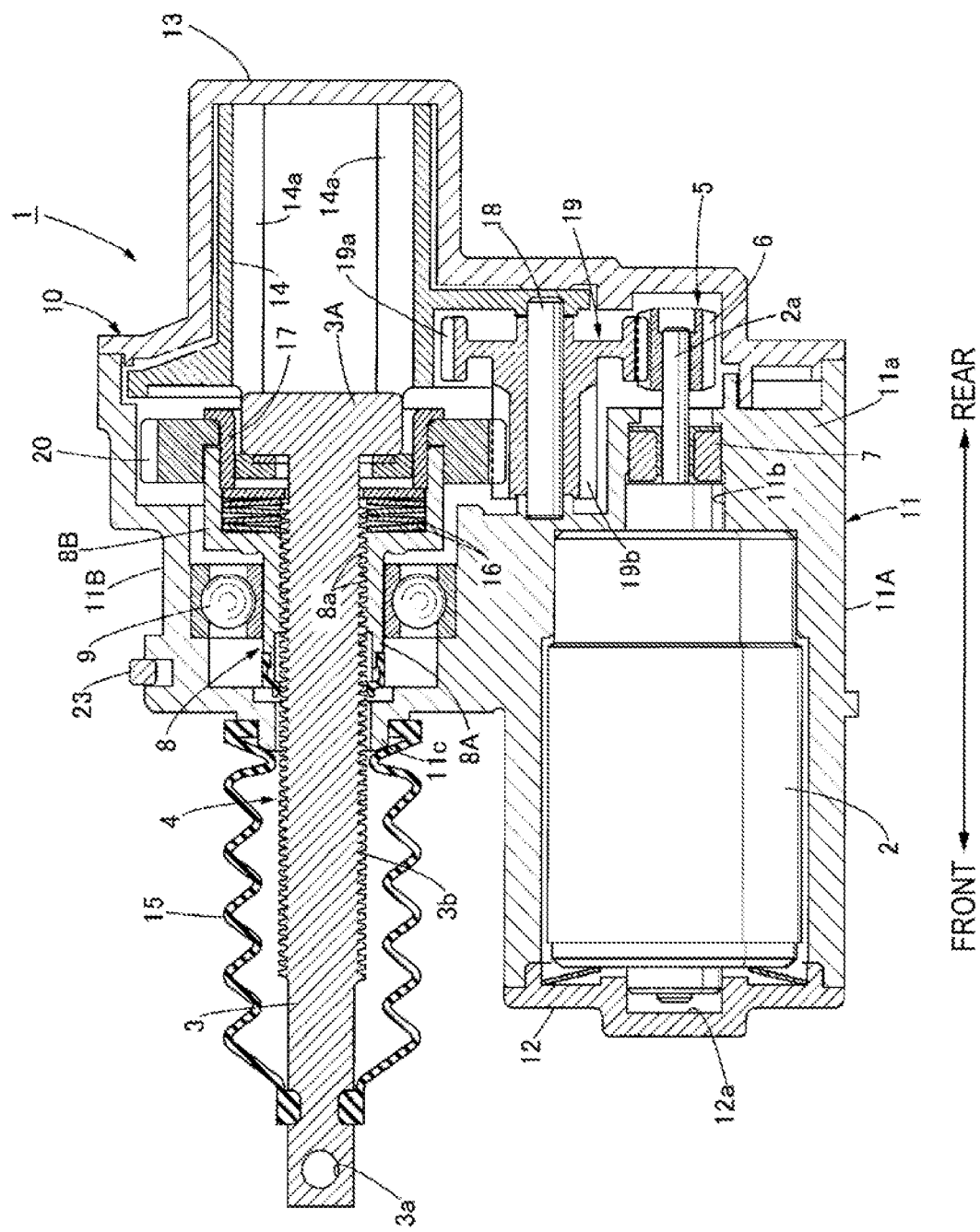
FIG. 2 is a planar sectional view of the electric actuator according to the present invention.

FIG. 1 is a perspective view of an electric actuator according to the present invention. FIG. 2 is a planar sectional view of the electric actuator.

An electric actuator 1 according to this embodiment is provided in an electric parking brake device (not shown). As illustrated in FIG. 2, the electric actuator 1 includes an electric motor 2 which serves as a drive source and is capable of rotating forward and backward; a motion conversion mechanism 4 configured to convert rotation of the electric motor 2 into a reciprocating linear motion of a screw shaft 3; and a transmission mechanism (gear mechanism) 5 configured to transmit rotation of the electric motor 2 to the motion conversion mechanism 4. The electric motor 2, the motion conversion mechanism 4, and the transmission mechanism 5 are housed in an actuator case 10. In the following description, the direction of the arrows illustrated in FIG. 1 and FIG. 2 is defined as a front-and-rear direction.

The actuator case 10 includes a case main body 11, a motor cover 12, and a gear cover 13. The case main body 11 integrally includes a first case 11A and a second case 11B each having a cylindrical shape. The motor cover 12 is mounted to an opening end of the first case 11A of the case main body 11, The gear cover 13 is mounted to an opening end of the case main body 11 on an opposite side (right side of FIG. 2) to the motor cover 12.

Further, as illustrated in FIG. the electric motor 2 is housed in the first case 11A of the case main body 11, and a driving gear 6 having a small diameter is mounted at an end portion (rear end portion) of an output shaft (motor shaft) 2a extending rearward from the electric motor 2 (rightward in FIG. 2) that faces the interior of the gear cover 13. One end (front end) of the electric motor 2 in the axial direction is fitted to and held in a recess portion 12a formed in the motor cover 12, and another end (rear end) of the electric motor 2 in the axial direction is fitted to and held in a circular hole 11b formed in an end wall 11a of the first case 11A, The output shaft (motor shall) 2a of the electric motor 2 is rotatably supported in the first case 11A through intermediation of a bearing 7.

Further, the second case 11B of the case main body 11 is integrally disposed on a lateral side of the first case 11A, and the motion conversion mechanism 4 is housed in the second case 11B. The motion conversion mechanism 4 includes a nut 8 and the screw shaft 3. The nut 8 is rotatable. The screw shaft 3 is threadedly inserted through the nut 8 so as to be movable in a linear motion.

The nut 8 includes a sleeve portion SA and a drum portion B, The drum portion 8B has a diameter larger than that of the sleeve portion 8A. The nut 8 is rotatably supported in the second case 11B through intermediation of a radial bearing (ball bearing) 9 mounted to an outer periphery of the sleeve portion 8A. A female thread 8a is formed in a helical pattern in an inner periphery of the sleeve portion 8A.

The screw shaft 3 is a slide member having a round rod-like shape elongated in the front-and-rear direction, A brake cable (not shown) is coupled to a circular hole 3a formed in a front end portion of the screw shaft 3, and another end of the brake cable is coupled to a parking brake lever of the electric parking brake device (not shown). Further, a flange portion 3A is integrally formed with the rear end of the screw shaft 3. An outer periphery of the flange portion 3A is engaged with a pair of guide grooves 14a formed along the axial direction in an inner periphery of a tubular guide member 14 housed in the gear cover 13. Accordingly, rotation of the screw shaft 3 is prevented by the guide member 14, and the screw shaft 3 moves in a reciprocating linear motion in the from-and-rear direction without rotation.

A male thread 3b is formed in a helical pattern in an outer periphery of the screw shaft 3 in a predetermined range, and the screw shaft 3 is threadedly inserted through the sleeve portion 8A of the nut 8. Thus, when the screw shaft 3 is inserted through the nut 8, the male thread 3b formed in the outer periphery of the screw shaft 3 and the female thread 8a formed in the inner periphery of the sleeve portion 8A of the nut 8 are threadedly engaged with one another.

Further, the portion of the screw shaft 3 extending to the exterior of the actuator case 10 is covered by a bellows boot 15. The boot 15 is made of, for example, a rubber material that is flexible and has good elasticity, and is extendable and contractable. One end (front end) of the boot 15 is fitted on an outer periphery of the front end portion of the screw shaft 3, and another end (rear end) of the boot 15 is fitted on an outer periphery of a tubular portion 11c that is disposed so as to project from the second case 11B of the actuator case 10.

Incidentally, as illustrated in FIG. 2, a plurality of disc springs 16 are housed under a state of being stacked in the axial direction in a space in the axial direction formed inside the drum portion 8B of the nut 8 between the drum portion 8B and the flame portion 3A of the screw shaft 3. The position of the disc springs 16 in the axial direction is regulated by a retainer 17 that comes into abutment against the driven gear 20. The disc springs 16 are urging members configured to urge the screw shaft 3 in the direction away from the nut (rearward).

The configuration of the transmission mechanism 5 is now described below with reference to FIG. 2.

The transmission mechanism 5 is configured to transmit rotation of the output shaft 2a of the electric motor 2 to the nut 8 of the motion conversion mechanism 4. The transmission mechanism 5 includes the driving gear 6 mounted to the output shaft 2a of the electric motor 2, an intermediate gear 19 rotatably supported by a support shaft 13, and the driven gear 20 mounted to an outer periphery of the drum portion SB of the nut 8.

The intermediate gear 19 is rotatably supported by the support shaft 18 disposed between the case main body 11 of the actuator case 10 and the guide member 14 and integrally includes a large-diameter intermediate gear 19a and a small-diameter intermediate gear 19b, which are different in diameter. The large-diameter intermediate gear 19a meshes with the driving gear 6 and has a diameter larger than the diameter of the driving gear 6. Further, the small-diameter intermediate gear 19b meshes with the driven gear 20 having a diameter larger than that of the large-diameter intermediate gear 19a. The driven gear 20 is fitted on the outer periphery of the drum portion 8B of the nut 8.

Figure 3:
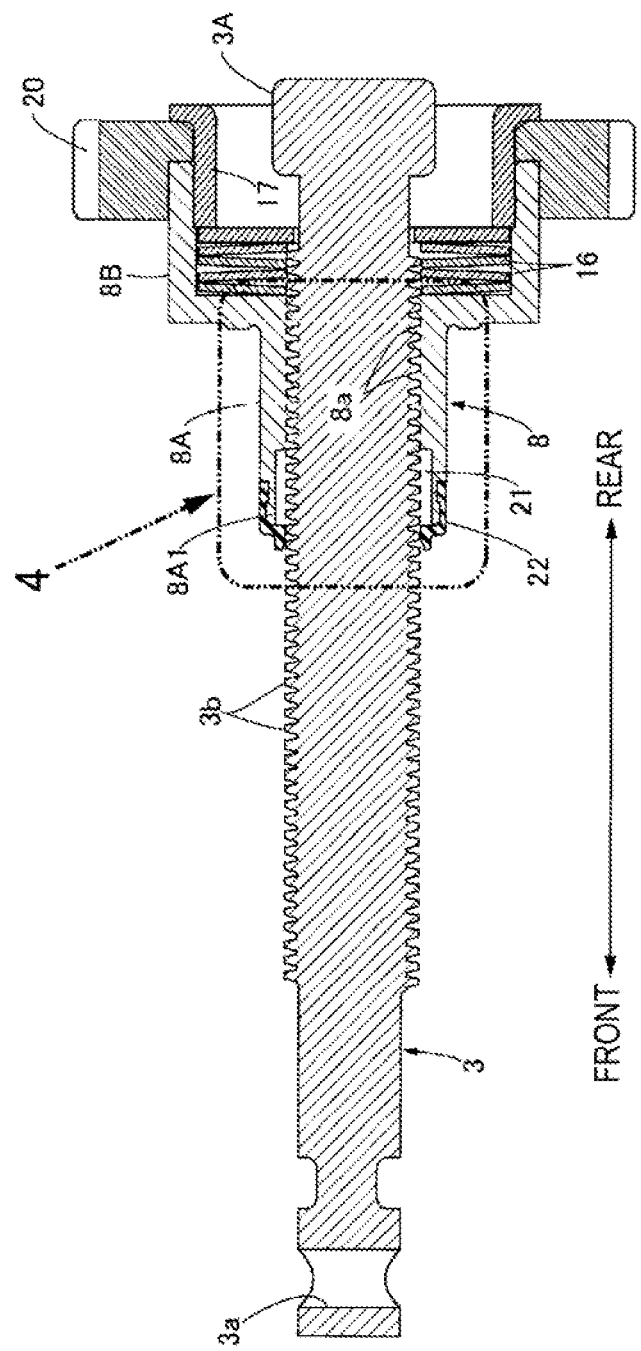
FIG. 3 is a planar sectional view of a nut and a screw shaft portion of the electric actuator according to the present invention.
Figure 4:
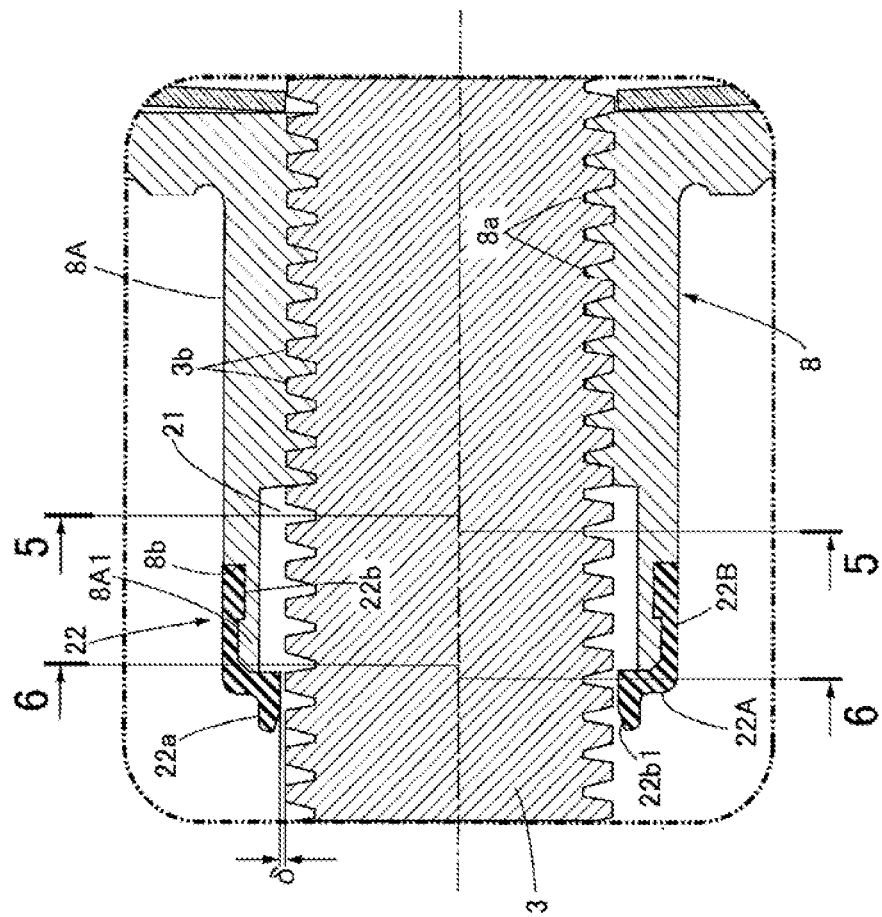
FIG. 4 is an enlarged detailed view of the portion 4 of FIG. 3.
Figure 5:
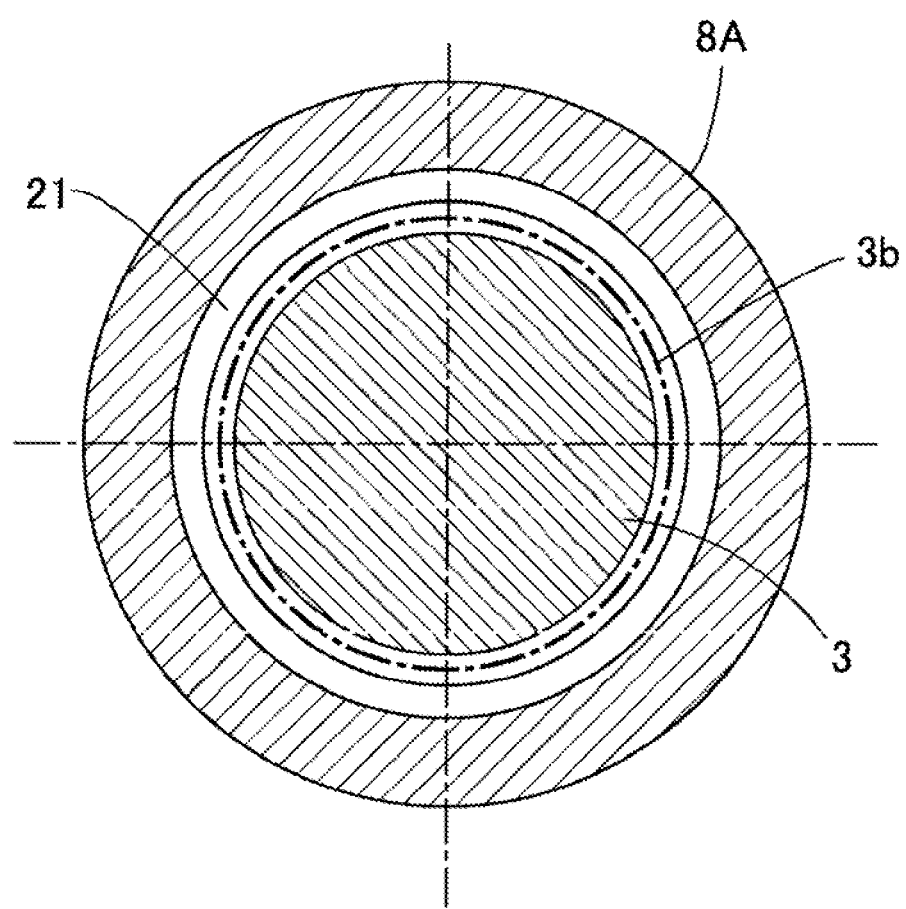
FIG. 5 is a sectional view taken along the line 5-5 of FIG. 4.
Figure 6:
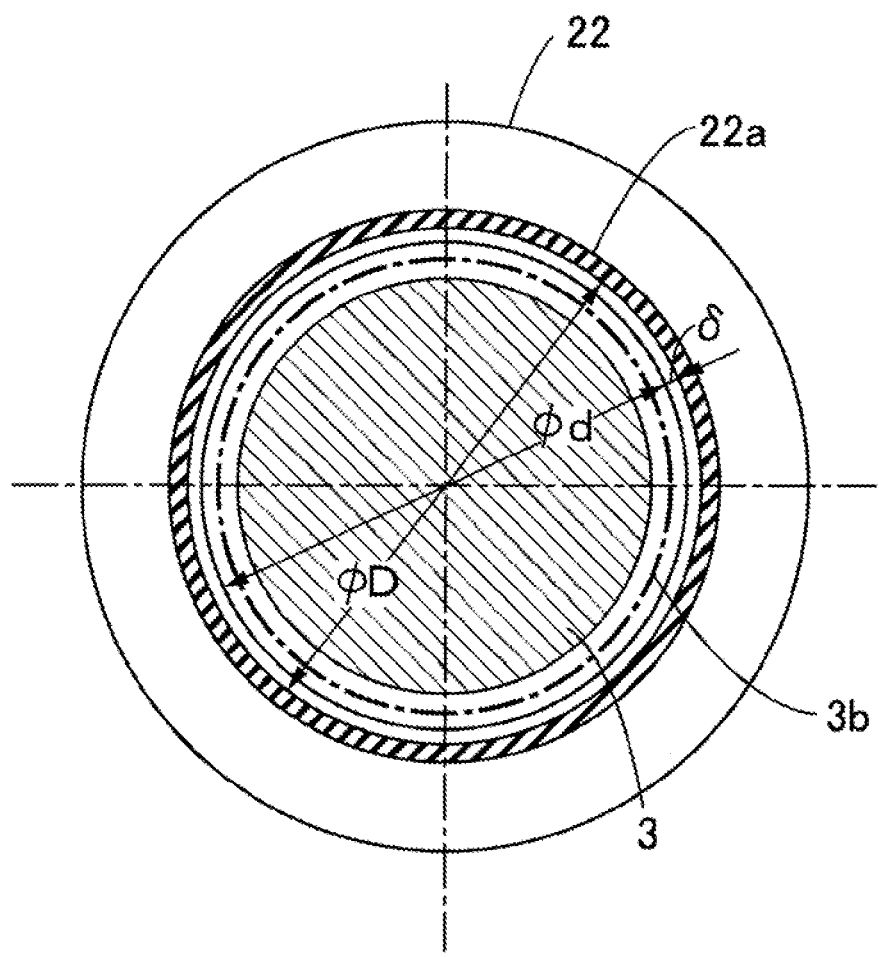
FIG. 6 is a sectional view taken alone the line 6-6 of FIG. 4.

Next, the characteristic configuration of the present invention is now described on the basis of FIG. 3 to FIG. 6, FIG. 3 is a planar sectional view of a nut and screw shaft portion of an electric actuator according to the present invention, FIG. 4 is an enlarged detailed view of the portion 4 of FIG. 3. FIG. 5 is a sectional view taken along the line 5-5 of FIG. 4. FIG. 6 is a sectional view taken along the line 6-6 of FIG. 4.

In this embodiment, as illustrated in FIG. 3 to FIG. 5, a lubricant holding portion 21 having an outer diameter larger than the diameter of the screw hole of the not 8 is formed on an inner periphery of one end (front end portion) 8A1 of the sleeve portion 8A of the nut 8 in the axial direction, and the lubricant holding portion 21 is capable of housing a lubricant, for example, grease. Further, a lid member 22 configured to cover an opening end of the lubricant holding portion 21 in the axial direction is mounted to the outer periphery of the one end portion (front end portion) 8A1 of the sleeve portion 8A of the nut 8 in the axial direction.

The lid member 22 is made of a rubber material and integrally formed. As illustrated in FIG. 4, the lid member 22 integrally includes a lid portion 22A and a tubular portion 22B. The lid portion 22A has a ring plate-like shape that covers the opening end of the lubricant holding portion 21 in the axial direction from the axial direction. The tubular portion 22B has a cylindrical shape and is coaxial with the nut 8. As illustrated in FIG. 4, a protrusion portion 22b having a ring shape is integrally formed around the entire periphery of an inner periphery of the end portion of the tubular portion 22B of the lid member 22, and a recess portion 8b having a ring groove-like shape is integrally formed around the entire periphery of the outer periphery of the end portion of the sleeve portion 8A of the nut 8.

Further, through fitting of the protrusion portion 22b formed on the inner periphery of the end portion of the tubular portion 22B into the recess portion 81) formed in an outer periphery of the end portion of the sleeve portion 8A of the nut 8, the lid member 22 can be easily mounted to the outer periphery of the end portion of the sleeve portion SA of the nut 8 by one action. In this embodiment, the protrusion portion 22b is formed on the tubular portion 22B side of the lid member 22, and the recess portion Sb is formed on the sleeve portion 8A side of the nut 8, However, conversely, a recess portion may be formed on the tubular portion 22B side of the lid member 22, and a protrusion portion may be firmed on the sleeve portion 8A side of the nut 8, Also through engagement of the recess portion and the protrusion portion together in this manner, the lid member 22 can be easily mounted to the outer periphery of the end portion of the sleeve portion 8A of the nut S by one action.

Incidentally, in this embodiment, as illustrated in FIG. 4, the tubular portion 22B of the lid member 22 and the sleeve portion 8A of the nut 8 have the same outer diameter. Further, a cylindrical scraper portion (scraping portion) 22a integrally projecting forward (leftward in FIG. 4) is integrally formed on an inner periphery of the lid portion 22A of the lid member 22, and a tapered surface 22b1 that increases in diameter forward (leftward in FIG. 4) is formed on an inner periphery of the front end of the scraper portion 22a. As illustrated in FIG. 6, an inner diameter φD (t the scraper portion 22a is slightly larger than an outer diameter φd of the screw shaft 3 (φD>φd). Thus, a ring-shaped small gap δ(=(D−d)/2) in the radial direction is formed between the scraper portion 22a and the screw shaft 3.

Figure 7:
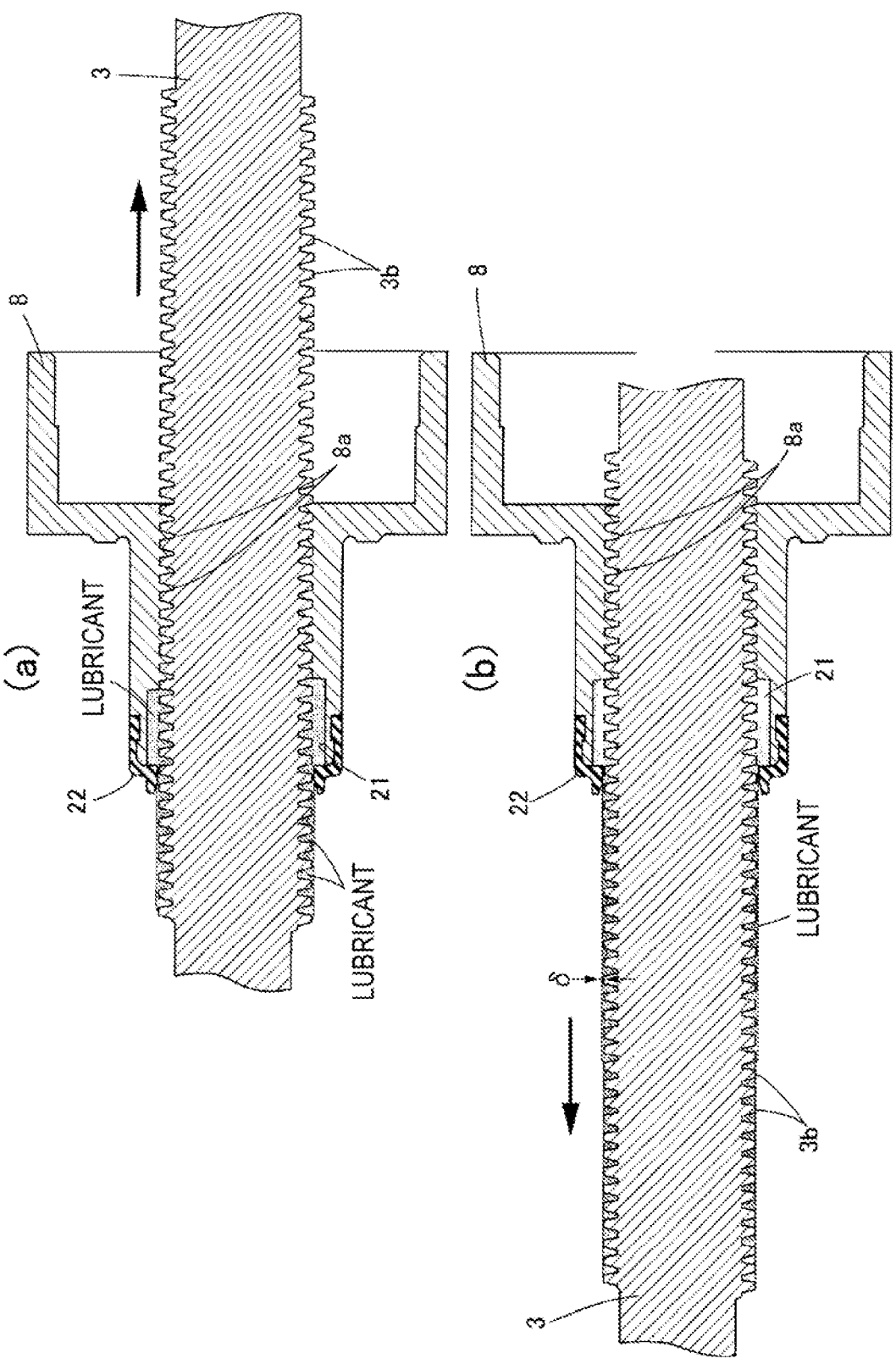
FIG. 7(a) and FIG. 7(b) are schematic sectional views for illustrating a state in which lubricant is applied to the screw shaft of the electric actuator according to the present invention.
Figure 8:
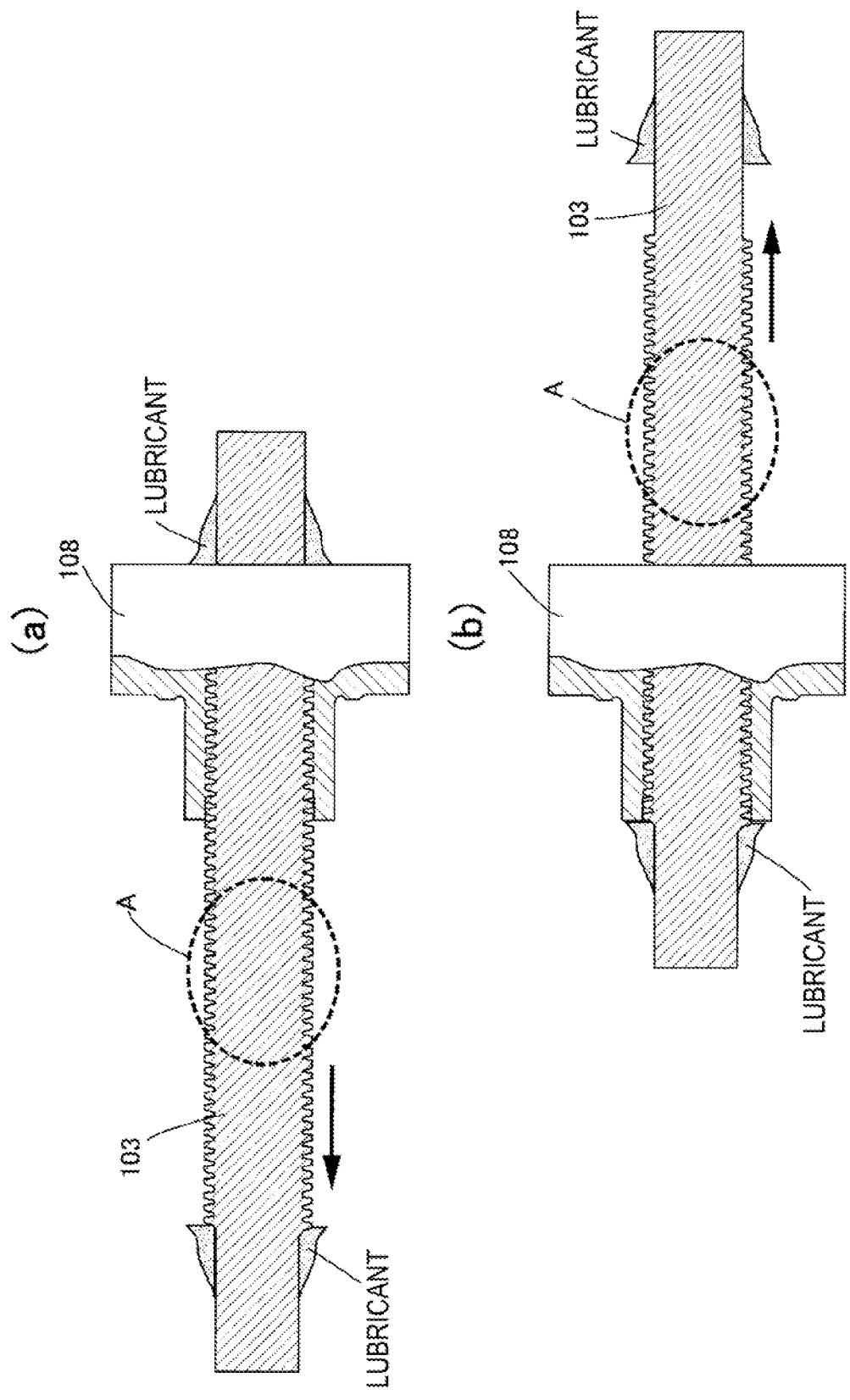
FIG. 8(a) and FIG. 8(h) are schematic sectional views for illustrating a state in which lubricant is applied to a screw shaft of a related-art electric actuator.

Further, the electric actuator 1 having the configuration described above is used as an actuator of an electric parking brake device (not shown). The actions of the electric actuator 1 is now described with reference to FIG. 7. The electric actuator 1 is positioned and fixed in the electric parking brake device using a snap ring 23 (see FIG. 1 and FIG. 2) fitted around an outer periphery of the actuator case 10.

In the state illustrated in FIG. 2, the screw shaft 3 is advanced forward, a brake cable (not shown) mounted to the distal end of the screw shaft 3 is slack. In this state, the brake shoes of the drum brake are separated from the inner peripheral surface of the brake drum. Thus, no frictional resistance force is generated between the brake shoes and the brake drum, and the electric parking brake device is in a state with the parking brake released. Accordingly, the brake drum and the wheel car freely rotate, and the vehicle can thus travel.

In this state, when a parking brake switch (not shown) is turned ON, the electric motor 2 of the electric actuator 1 is energized so that the electric motor 2 starts up. Then, rotation of the output shaft 2a of the electric motor 2 is reduced in speed by the transmission mechanism 5 and transmitted to the motion conversion mechanism 4, and rotation of the output shaft 2a of the electric motor 2 is converted into a linear motion (backward movement) of the screw shaft 3.

That is, rotation of the output shaft 2a of the electric motor 2 is reduced in speed and transmitted from the driving gear 6 to the intermediate gear 19, and the intermediate gear 19 rotates at a predetermined speed. Further, rotation of the intermediate gear 19 is reduced in speed via the small-diameter intermediate gear 19b and the driven gear 20 in mesh with each other and transmitted to the nut 8 of the motion conversion mechanism 4, and the nut 8 rotates at a predetermined speed.

As described above, when the nut S rotates, the screw shaft 3 threadedly inserted through the nut S moves backward in a linear motion as illustrated in FIG. 7(a) so that the brake cable (not shown) mounted to the distal end of the screw shaft 3 is pulled. As a result, the parking brake lever of the electric parking brake device is operated so that the brake shoes open out, and the brake shoes are pressed against the inner peripheral surface of the brake drum, causing a frictional resistance force therebetween. The rotation of the brake drum and the wheel is braked b the frictional resistance force, and the vehicle is thus brought into a parking brake state.

When the parking brake switch (not shown) is turned OFF to release the parking brake state, the electric motor 2 rotates backward, with rotation of the output shaft 2a being transmitted to the nut S of the motion conversion mechanism 4 via a transmission path similar to that described above. This causes the nut 8 to rotate backward. When the nut 8 rotates backward in this manner, the screw shaft 3 threadedly inserted through the nut 8 moves forward in a linear motion in the direction of the arrow of FIG. 7(b), and the electric actuator 1 returns to the state illustrated in FIG. 2. Thus, the electric parking brake device is brought into a released state.

In this embodiment, the lubricant holding portion 21 having an outer diameter larger than the diameter of the screw hole of the nut S and being capable of housing a lubricant is formed on an inner periphery of an end of the nut S in the axial direction, and the lid member 22 configured to cover the opening end of the lubricant holding portion 21 in the axial direction is provided. Thus, even when rotation of the out S causes the screw shaft 3 to enter the nut 8, the lubricant applied to the screw shaft 3 is held in the lubricant holding portion 21 of the nut S. Thus, as illustrated in FIG. 7(a) and FIG. 7(b), extra lubricant does not accumulate at the end surface of the nut 8, and the accumulated lubricant is not scattered out by the centrifugal force generated by the rotation of the nut 8.

Further, the lubricant collected in the lubricant holding portion 21 of the nut S is applied to the screw shaft 3 when the screw shaft 3 comes out from the nut S. However, the lubricant application amount is restricted by the lid member 22, and hence the necessary sufficient amount of lubricant is applied to the screw shaft 3 in a broad range. As a result, partial insufficiency of lubricant (oil film disappearing) on the screw shaft 3 does not occur, and the threaded engagement portion between the nut 8 and the screw shaft 3 is sufficiently lubricated, thereby preventing wear at the threaded engagement portion and improving the durability of the nut 8 and the screw shaft 3.

Further, in this embodiment, the inner diameter φD of the scraper portion 22a formed on an inner periphery of the lid portion 22A of the lid member 22 is slightly larger than the outer diameter od of the screw shaft 3 (φD>φd), and a small gap δ in the radial direction is formed therebetween. Thus, the lubricant collected in the lubricant holding portion 21 of the nut 8 is scraped by the scraper portion 22a, and, as illustrated in FIG. 7(a) and FIG. 7(b), is applied evenly at a predetermined thickness 6 on the screw shaft 3, in this case, the scraper portion 22a is in non-contact with the screw shaft 3. Thus, no frictional resistance force is generated therebetween, thereby allowing the screw shaft 3 to slide smoothly without resistance. Further, the scraper portion 22a does not receive an external force from the screw shaft 3. Thus, the scraper portion 22a is prevented from being damaged, thereby improving the durability of the lid member 22.

Incidentally, even though the nut 8 is inserted through and installed in the radial bearing 9, the outer diameter of the tubular portion 22B of the lid member 22 is equal to or less than the outer diameter of the sleeve portion SA of the nut 8. Thus, even when the nut 8 is inserted through the radial bearing 9 after the lid member 22 is installed on the nut 8, the nut 8 can be mounted without the lid member 22 interfering with the radial bearing 9.

Further, in this embodiment, the lid member 22 is made of a rubber material that is flexible and has good elasticity. Thus, even in a case in which the lid member 22 comes into contact with the screw shaft 3 the effects that the lid member 22 is prevented from being damaged and the durability of the lid member 22 is improved can still be obtained.

Note that in the embodiment described above, the present invention is applied to an electric actuator provided in an electric parking brake device of a drum brake for a vehicle. However, the present invention may be applied in a similar manner to an electric actuator used in any other devices.

Also, the present invention is not limited to the application of the embodiment described above, and, naturally, various modifications can be made within the scope of the claims and the technical scope described using the specification and the drawings.

The invention claimed is:

1. An electric actuator comprising:
an electric motor capable of rotating forward and backward; and
a motion conversion mechanism configured to convert rotation of the electric motor into a reciprocating linear motion of a screw shaft, the motion conversion mechanism including:
a nut configured to be rotationally driven by the electric motor; and
the screw shaft capable of being threadedly inserted through the nut in a back and forth movable manner,
wherein the nut includes a sleeve portion and a drum portion that has an outer diameter larger than that of the sleeve portion,
wherein the screw shaft is threadedly inserted through the sleeve portion of the nut,
wherein a lubricant holding portion having an outer diameter larger than a diameter of a screw hole of the nut and being capable of housing a lubricant is formed on an inner periphery of an end portion of the sleeve portion of the nut in an axial direction,
wherein a lid member configured to cover an opening end of the lubricant holding portion in the axial direction is provided to an outer periphery of the end portion of the sleeve portion of the nut in the axial direction,
wherein the lid member integrally includes:
a lid portion; and
a tubular portion coaxial with the nut,
wherein the lid member is mounted to the outer periphery of the end portion of the sleeve portion of the nut through fitting of a protrusion portion formed on an inner periphery of the tubular portion to a recess portion formed in an outer periphery of the end portion of the sleeve portion of the nut or through fitting of a protrusion portion formed on the outer periphery of the sleeve portion of the nut to a recess portion formed in the inner periphery of the tubular portion.

2. The electric actuator according to claim 1, wherein a scraper portion having a cylindrical shape is formed on an inner periphery of the lid portion, and an inner diameter of the scraper portion is slightly larger than an outer diameter of the screw shaft so that a small gap in a radial direction is formed between the scraper portion and the screw shaft.

3. The electric actuator according to claim 2, wherein an outer diameter of the tubular portion is equal to or less than the outer diameter of the sleeve portion of the nut.

4. The electric actuator according to claim 1, wherein an outer diameter of the tubular portion is equal to or less than the outer diameter of the sleeve portion of the nut.

5. The electric actuator according to claim 2, wherein the lid member is made of a rubber material.

6. The electric actuator according to claim 1, wherein the lid member is made of a rubber material.

7. The electric actuator according to claim 4, wherein the lid member is made of a rubber material.

* * * * *